US010135312B2

(12) United States Patent
Kim et al.

(10) Patent No.: US 10,135,312 B2
(45) Date of Patent: Nov. 20, 2018

(54) GUIDE MEMBER FOR MOTOR AND STATOR AND MOTOR INCLUDING THE SAME

(71) Applicant: LG Innotek Co., Ltd., Seoul (KR)

(72) Inventors: Yong Joo Kim, Seoul (KR); Young Gu Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 196 days.

(21) Appl. No.: 15/167,015

(22) Filed: May 27, 2016

(65) Prior Publication Data

US 2016/0352175 A1 Dec. 1, 2016

(30) Foreign Application Priority Data

May 28, 2015 (KR) ........................ 10-2015-0074579

(51) Int. Cl.
*H02K 3/52* (2006.01)
*H02K 3/26* (2006.01)
*H02K 1/12* (2006.01)
*H02K 3/28* (2006.01)

(52) U.S. Cl.
CPC ............... *H02K 3/521* (2013.01); *H02K 1/12* (2013.01); *H02K 3/28* (2013.01); *H02K 3/522* (2013.01); *H02K 2203/06* (2013.01)

(58) Field of Classification Search
CPC ............ H02K 1/12; H02K 3/28; H02K 3/521; H02K 15/085; H02K 2203/06; H02K 3/48; H02K 3/522; H02K 5/24; B62D 5/04
USPC .......................................... 310/51
See application file for complete search history.

(56) References Cited

U.S. PATENT DOCUMENTS

| | | | |
|---|---|---|---|
| 2006/0186279 A1 | 8/2006 | Kato | |
| 2007/0232094 A1 | 10/2007 | Hoshika | |
| 2013/0320182 A1 | 12/2013 | Kataoka et al. | |
| 2013/0328425 A1* | 12/2013 | Tomita | H02K 11/0094 310/71 |
| 2014/0292124 A1* | 10/2014 | Nakamura | H02K 15/026 310/71 |

FOREIGN PATENT DOCUMENTS

| | | |
|---|---|---|
| DE | 4339384 A1 | 5/1995 |
| DE | 102010039335 A1 | 2/2012 |

(Continued)

OTHER PUBLICATIONS

Extended European Search Report dated Oct. 18, 2016 in European Application No. 16171399.5.

(Continued)

*Primary Examiner* — Alex W Mok
(74) *Attorney, Agent, or Firm* — Saliwanchik, Lloyd & Eisenschenk

(57) ABSTRACT

The present invention relates to a structure of a guide member performing a vibration preventing function of a coil and a motor using the same. In the structure of the guide member which guides the coil wound around a stator to an external power module, and a vibration preventing pattern is provided in a coil guide groove, thereby implementing a stable fixing force of the coil when the motor is driven and solving a problem of noise due to a vibration of the coil. Therefore, a steering wheel is operated more stably.

15 Claims, 8 Drawing Sheets

(56) References Cited

FOREIGN PATENT DOCUMENTS

| EP | 1469249 A1 | 10/2004 |
|----|------------|---------|
| JP | H1118331 A | 1/1999 |
| JP | 2002281708 A | 9/2002 |
| JP | 2013243800 A | 12/2013 |

OTHER PUBLICATIONS

Office Action dated Jun. 20, 2017 in European Application No. 16171399.5.
European Office Action dated Nov. 22, 2017 in European Application No. 16171399.5.

* cited by examiner (a)

(b)

(c)

(d)

GUIDE MEMBER FOR MOTOR AND STATOR AND MOTOR INCLUDING THE SAME

CROSS-REFERENCE TO RELATED APPLICATION

This application claims priority under 35 U.S.C. § 119 to Korean Patent Application No. 2015-0074579, filed on May 28, 2015, which is hereby incorporated by reference in its entirety.

BACKGROUND

Field of the Invention

The present invention relates to a coil guide member structure for a motor which implements a coil-vibration preventing function and a motor using the same.

Discussion of Related Art

Generally, an electronic power steering (EPS) system is used to ensure stability of steering of a vehicle. An electronic control unit (ECU) operates a motor according to operating conditions detected by a vehicle speed sensor, a torque angle sensor, a torque sensor, and the like, and the EPS system ensures turning stability and provides a quick returning force, thereby allowing a driver to safely drive a vehicle. The EPS system can perform a steering operation with much less power by using a motor by which torque is assisted to operate a steering wheel to allow a driver to steer the vehicle. A brushless direct current (BLDC) motor is used as the motor.

The BLDC motor includes a stator and a rotor as main components. A coil is wound around the stator, and a magnet is coupled to the rotor, and thus the rotor is rotated by mutual electromagnetic interaction.

The wound coil comes in contact with a busbar connected to an external power supply device, and power is supplied to the stator of the EPS motor formed as above.

However, because it is difficult to fix the coil itself when the motor is operated, the coil connected to the busbar becomes a factor which deteriorates a drive environment due to noises caused by a vibration of the coil when the coil is continuously used in an environment with severe vibration. Also, when the coil is fixed to an external structure using an adhesive to prevent the above problem, there are problems in that it is difficult to completely fix the coil due to degeneration and omission of the adhesive caused by an external environment and manufacturing costs are increased.

SUMMARY OF THE INVENTION

The present invention is directed to a guide member structure of a coil for a motor capable of having a more stable steering wheel operation, wherein the guide member structure guides a coil wound around a stator to an external power module to solve the above-described problem by including a vibration preventing pattern inside a coil guide groove to implement a stable fixing force of the coil when the motor is operated and to reduce noise caused by a vibration of the coil.

According to an aspect of the present invention, there is provided a guide member for a motor including a guide member body, at least one coil-winding guide part provided on an upper surface of the guide member body and a vibration preventing pattern formed protruding from an inner side of the coil-winding guide part.

According to an aspect of the present invention, there are provided a stator coupled with the above-described guide member for a motor, and an electric power steering (EPS) motor coupled to a structure of a rotor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
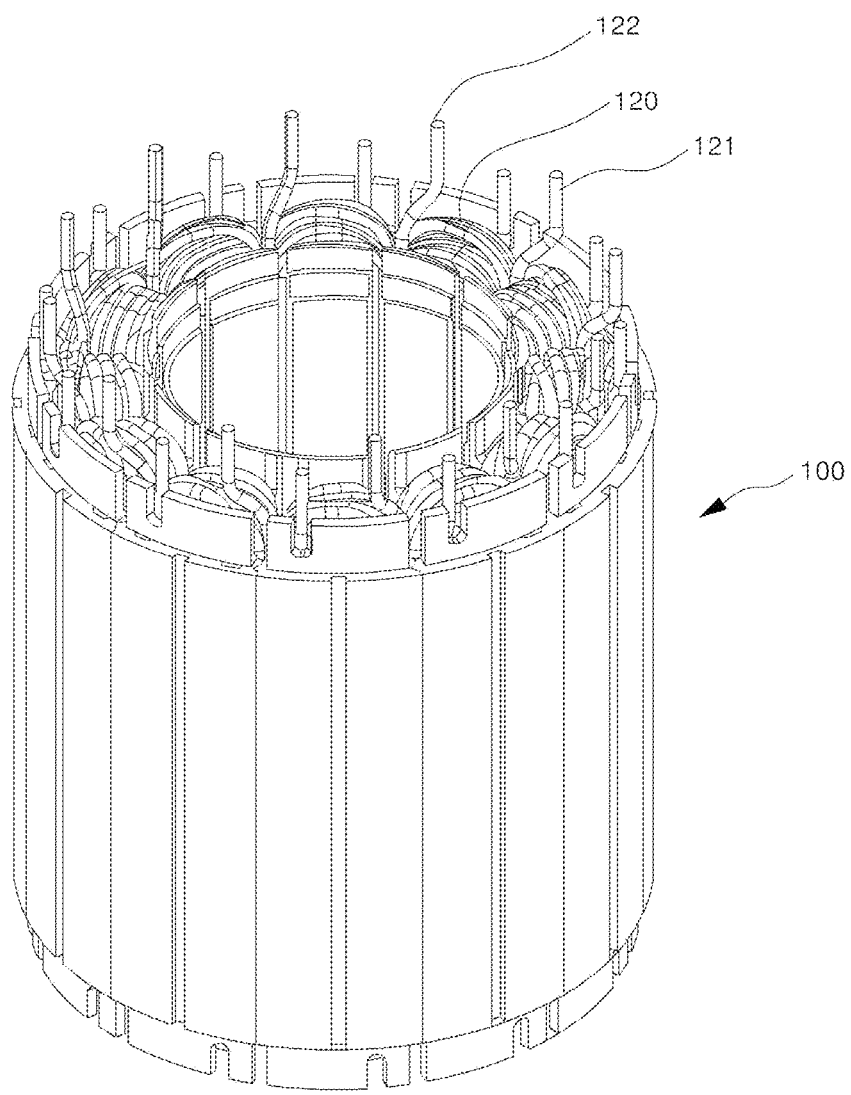
FIG. 1 is a perspective view illustrating a stator of a motor and a wound structure of a coil.

Hereinafter, a configuration and an operation of an exemplary embodiment of the present invention will be described in detail with reference to accompanying drawings. In descriptions with reference to the accompanying drawings, like reference numerals are used for like elements even in different drawings, and a redundant description of the same components will be omitted. Although the terms first, second, etc. are used to describe various components, these components are not limited by these terms. The terms are used to only to distinguish one component from others.

Figure 2:
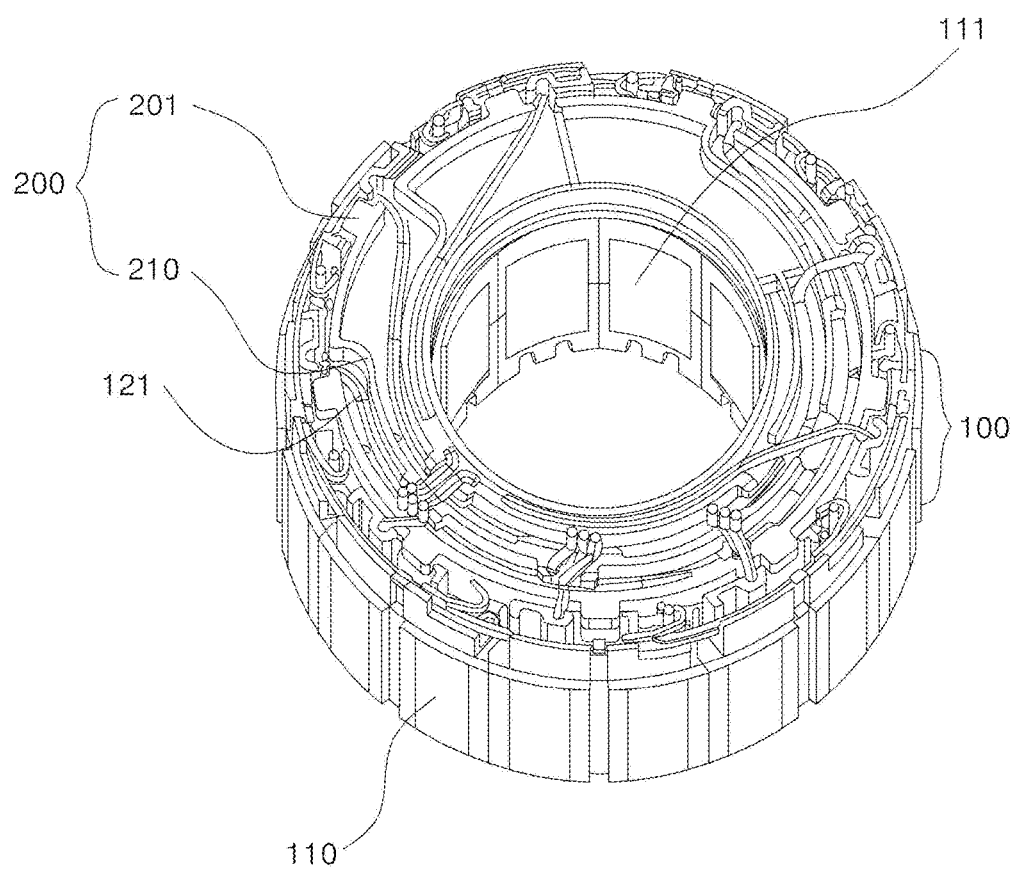
FIG. 2 illustrates a perspective schematic view of a structure in which the stator of FIG. 1 and a guide member for a motor are coupled to each other.
Figure 3:
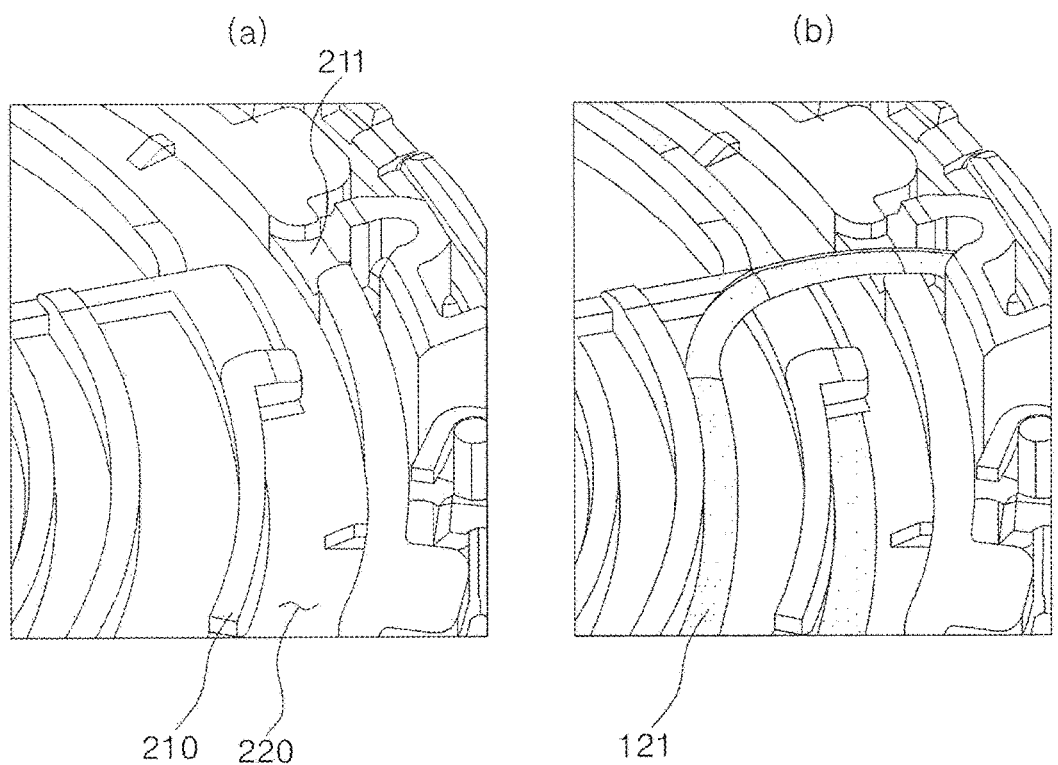
FIGS. 3 and 4 are schematic views of main components for describing an operation of a motor provided with a vibration preventing pattern according to the embodiment of the present invention.
Figure 4:
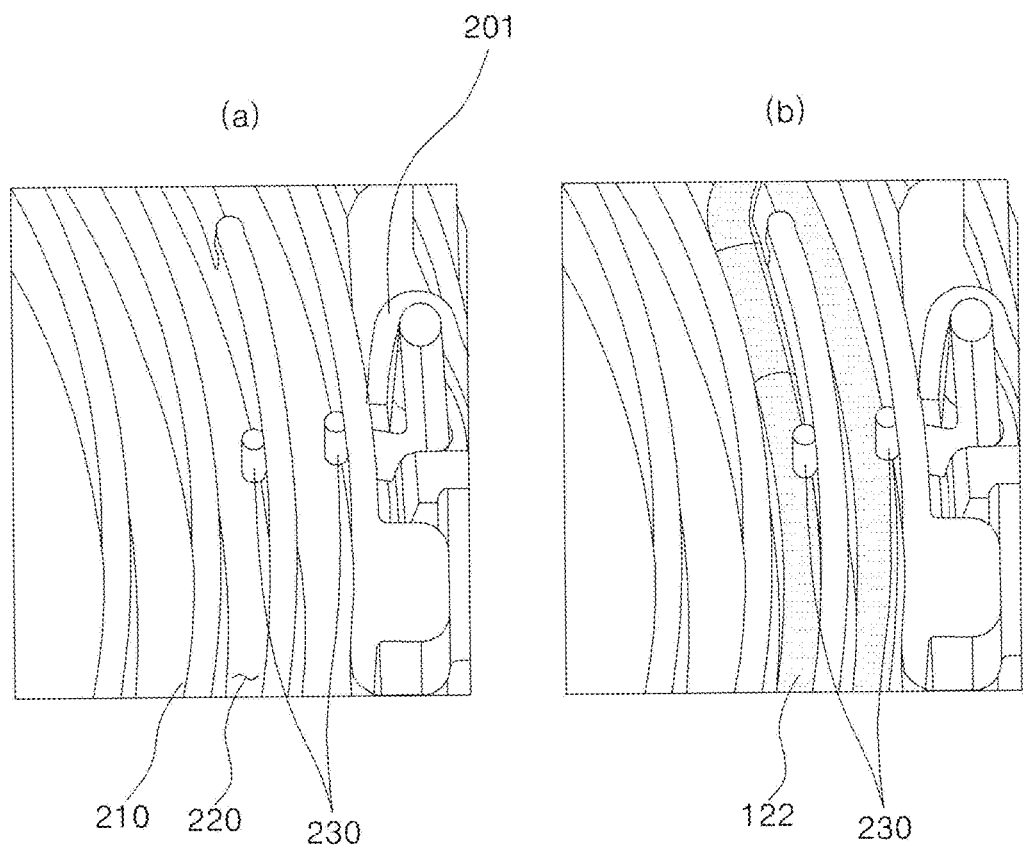

FIG. 1 is a perspective view illustrating a stator of a motor and a wound structure of a coil, FIG. 2 illustrates a perspective schematic view of a structure in which the stator of FIG. 1 and a guide member for a motor are coupled to each other, and FIGS. 3 and 4 are schematic views of main components for describing an operation of a motor with a vibration preventing pattern according to the embodiment of the present invention.

Referring to FIGS. 1 to 4, a coil guide member (referred to as a router) for a motor according to the embodiment of the present invention is disposed on an upper portion of a stator 100 as shown in FIG. 1. That is, the stator 100 has a structure in which a plurality of stator cores 110 having a plurality of teeth formed protruding toward the center from inner circumferential surfaces thereof are coupled to the stator 100, and a coil 120 is wound around each of the stator teeth 111. Also, tip ends 121 and 122 of the wound coils protrude outward as shown in FIG. 1 and are coupled to terminals of an external power supply device.

As with a structure shown in FIG. 2, the guide member for a motor according to the embodiment of the present invention, which is a structure disposed on the upper portion of the stator 100, may be defined as a structure in which the tip ends of the coils described in FIG. 1 guide a plurality of coil tip ends in a circular structure to be connected to the external power supply device.

As shown in FIG. 2, a guide member 200 for a motor according to the embodiment of the present invention includes a guide member body 201, at least one coil-winding guide part 210 provided on an upper surface of the guide member body, and a vibration preventing pattern 230 formed protruding from an inner side of the coil-winding guide part (see FIG. 4).

Specifically, the guide member 200 for a motor according to the embodiment of the present invention includes the guide member body 201 formed of an insulating material. The tip ends of the coils described in FIG. 1 extend from an upper portion of the guide member body 201 to be guided along an upper surface of the guide member body 201 to be guided in a specific direction, for example, toward a tip end of a power supply device. (The coil shown in FIG. 2 is partially illustrated for convenience of description.)

Specifically, the guide member body 201 includes the coil-winding guide part 210 having a predetermined width and depth to smoothly guide the tip end 121 of the coil. The coil-winding guide part 210, as shown in FIG. 2, is formed as a partitioned structure to form grooves with a predetermined height and width (hereinafter, referred to as guide grooves 220) or, although not shown, may also have a structure in which the guide groove is formed by cutting a groove with an engraved form.

However, in the case of the plurality of guide grooves 220, as shown FIG. 3A, grooves with a width through which coils pass are formed adjacent to each other as designed and, as shown in FIG. 3B, are guided in a structure in which the tip ends 121 of the coils are inserted along the guide grooves. However, in this case, when vibration of the motor is continuously generated, the coils vibrate. Because the width of the guide groove and the thickness of the coil are generally different from each other, the difference acts as several noise sources when a vehicle is driven.

Therefore, in the embodiment of the present invention, as shown in FIG. 4A, vibration preventing patterns 230 having a plurality of patterns protruding from inner walls of the guide grooves 220 toward the center are provided. Then, as shown in FIG. 4B, when the tip end 122 of the coil is inserted and guided, a uniform pressing force may be applied to the coil by the vibration preventing pattern 230 even when the thickness of the coil and the width of the guide groove are different from each other, thereby preventing the coil from unstably vibrating. The vibration preventing pattern 230 may be formed to protrude from the inner wall of the guide groove according to the embodiment of the present invention toward the center and may be formed of the same material as a material of the guide groove. In this case, the vibration preventing patterns 230 can be very simply manufactured at the same time with an extruding method and the like, and the manufacturing process can be simplified. Of course, when the vibration preventing pattern 230 is manufactured of an elastic material, a pressing force can be efficiently applied despite an application of the variable thickness of the coil.

Various modifications of the vibration preventing pattern will be described through FIGS. 5A to 5F.

Referring to FIGS. 5A to 5F, FIGS. 5A to 5F are cross-sectional schematic views illustrating structures in which the guide grooves 220 are formed at a coil-winding guide part 210 described above in FIGS. 4A and 4B as an example.

Figure 5A:
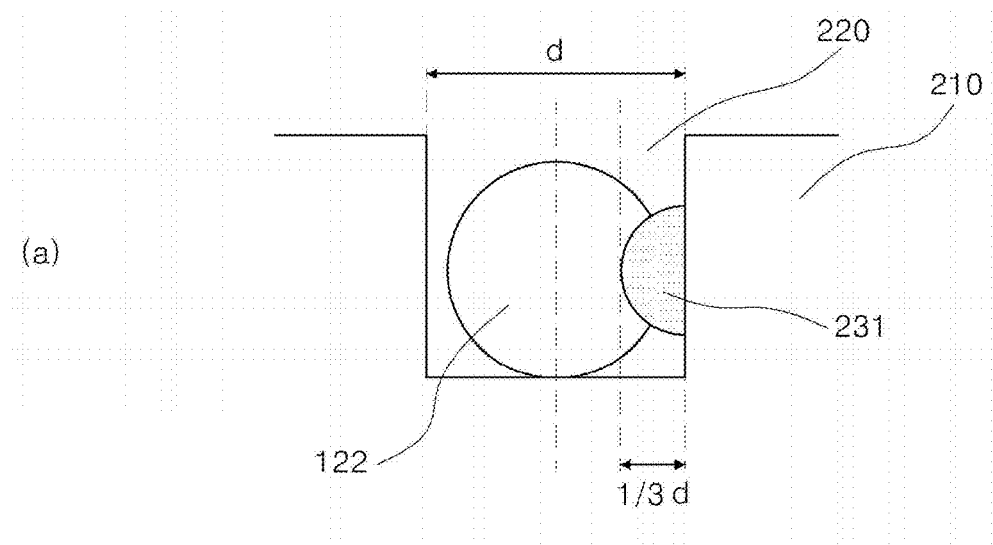
FIGS. 5A to 5F are schematic views illustrating forms of various vibration preventing patterns according to the embodiment of the present invention.

As shown in FIG. 5A, a vibration preventing pattern 231 has a structure which protrudes from an inner wall of the coil-winding guide part 210 toward the center and presses a coil 120 from a lateral direction, thereby preventing the coil from vibrating. To this end, particularly, the vibration preventing pattern according to the embodiment of the present invention may be formed to be equal to or less than one-third of an overall width d of the guide groove. When the width of a protruding pattern is greater than the width, a versatility of mounting the coil is excessively lowered, and thus the coil is damaged.

Figure 5B:
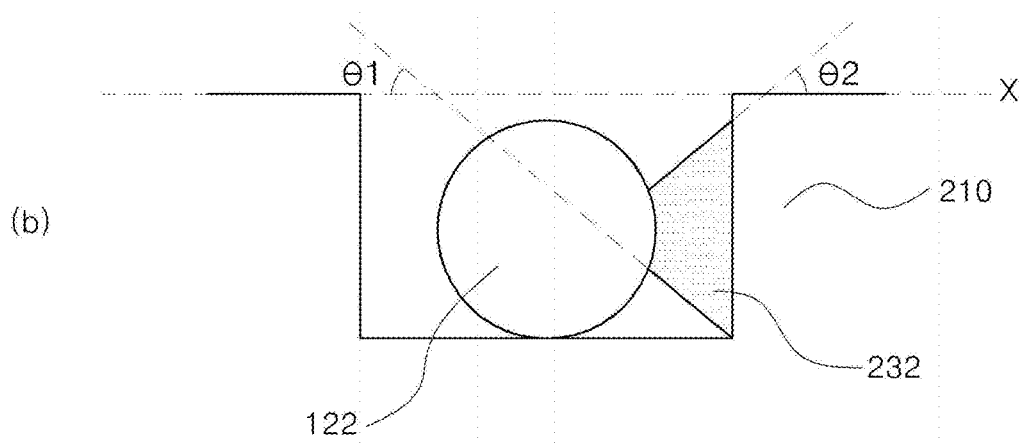

Also, the form of the vibration preventing pattern, as shown in FIG. 5B, may be formed in a protruding structure with a sloped structure having an angle of inclination formed on at least one side rather than in a round structure having a cross-section such as a semi-circle, an eclipse or the like. In the structure in FIG. 5B, when an angle θ1 of a slope of an upper portion is an acute angle with respect to an upper plane of the coil-winding guide part 210, the coil may be easily inserted into the guide groove. Further, when an angle θ2 of a slope of a lower portion is formed in the opposite direction to the above slope, a function of preventing an escape of the coil may be performed.

Figure 5C:
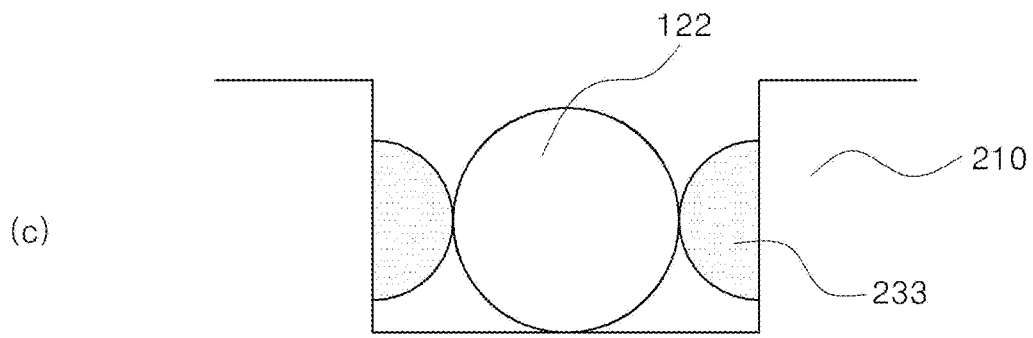

Also, as shown in FIG. 5C, the vibration preventing patterns 233 according to the embodiment of the present invention may be formed on both sides of inner sides of a pair of partition walls forming one guide groove rather than on any one side. An advantage of such a structure is that it can enhance a fixing force of the coil by stably pressing the coil from the left and the right.

Figure 5D:
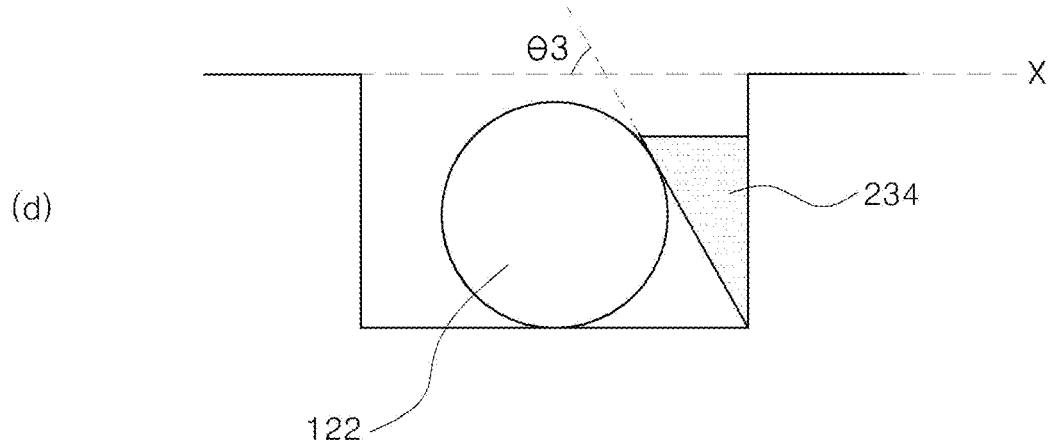

Unlike the structure in FIG. 5B, a structure shown in FIG. 5D, which has an angle θ3 of a slope formed in a reverse direction from a lower direction of a protrusion 234, may maximize the fixing force after the coil is inserted into the guide groove.

Figure 5E:
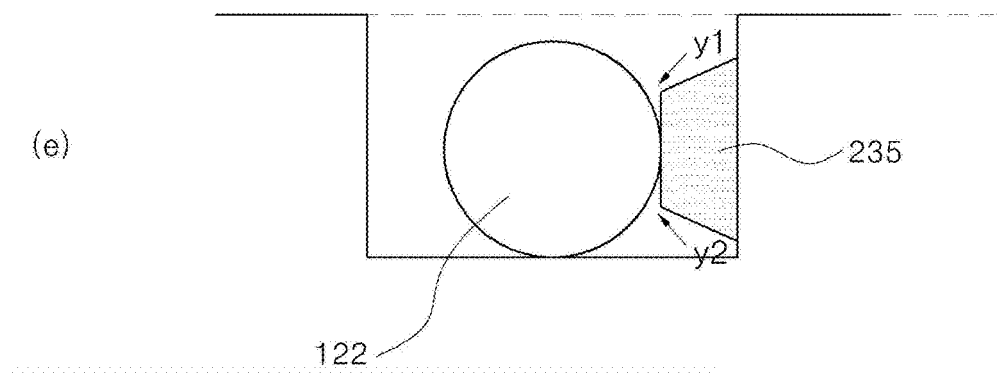

Also, unlike the structure in FIG. 5B, a structure in FIG. 5E has a length of a slope of a protruding structure of a vibration preventing pattern 235 so that a lower slope y2 is longer than an upper slope y1 to provide convenience of an insertion process and enhance the fixing force afterward.

Figure 5F:
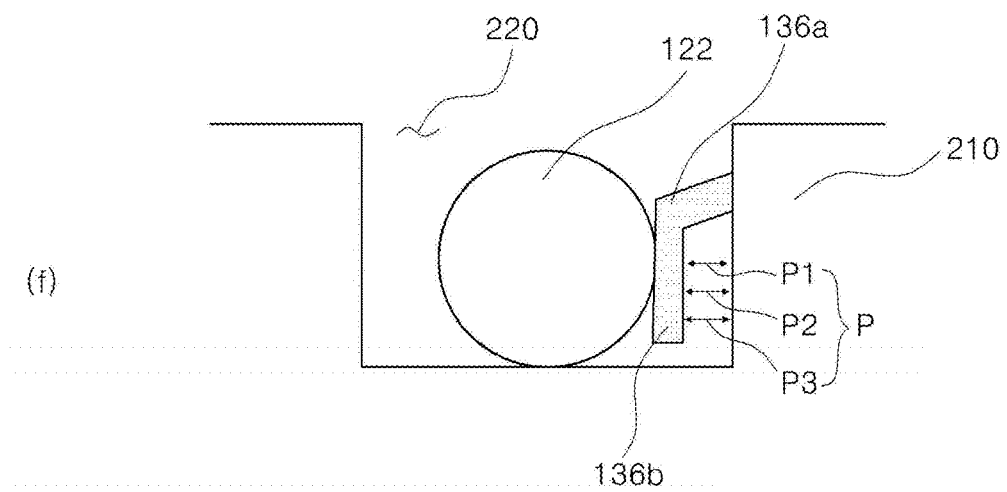

In FIG. 5F, the vibration preventing pattern of the present invention is formed to have elasticity. As described above, the vibration preventing pattern may be formed of a separate elastic member but, as shown, may be structurally formed to have a pressing force. That is, as shown in FIG. 5F, one end 136a of the vibration preventing pattern is coupled to and in contact with the coil-winding guide part 210, and the other end 136b except for the one end 136a forms a separate part separated from the inner side of the coil-winding guide part 210 and may be implemented as a structure having a predetermined elasticity. In this structure, a pressing force is provided while a tolerance between the thickness of the coil 120 and the width of the guide groove may be efficiently compensated for by a separate part P. Particularly, the separate part separated from the inner wall of the guide groove has a structure (P1<P2<P3) in which a width of the separate part becomes greater toward a depth direction of the guide groove to efficiently transfer the pressing force from the center of the guide groove toward the coil.

Figure 6:
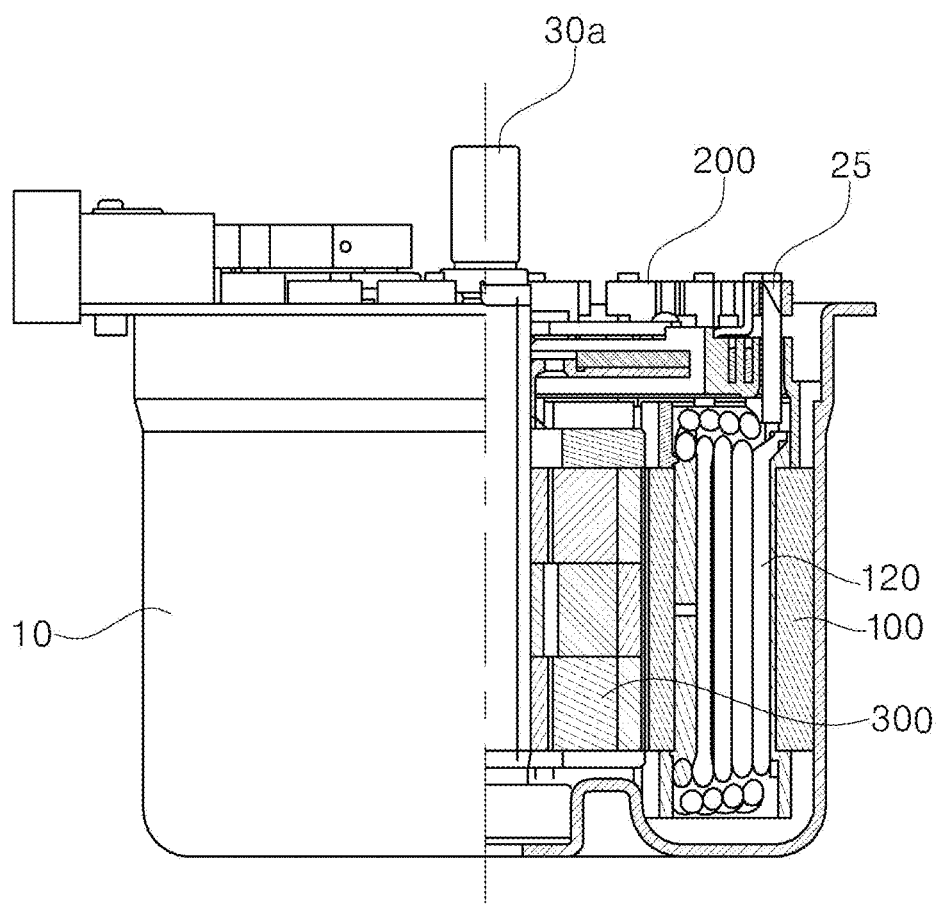
FIG. 6 is a cross-sectional schematic view illustrating a structure of an electronic power steering (EPS) motor to which the guide member for a motor according to the embodiment of the present invention is applied.

Hereinafter, an implementation example of an electric power steering (EPS) motor to which the guide member for a motor according to the embodiment of the present invention is applied will be described with reference to FIG. 6. But the guide member for a motor according to the embodiment may be applied to various motors. In the embodiment, the EPS motor will be described as an example.

The EPS motor to which the guide member 200 for a motor according to the embodiment of the present invention is applied includes a motor housing 10, a stator 100, and a rotor 300, and may include the guide member 200 for a motor for supplying power to the coil 120 wound around the stator 100, and a terminal 202 connected with an external power terminal. In this case, the structure according to the various embodiments of the present invention described above in FIGS. 1 to 5F may be applied to the guide member 200.

The motor housing 10 has a roughly cylindrical shape and has an opening on an upper side thereof and a closed lower side. The stator 100, the rotor 300, and a rotating shaft 30a rotatably supporting the rotor 300 are installed in the motor housing 10.

The stator 100 includes a stator core 110, a coil 120 and a coil terminal 25 coupled with the terminal of the coil. The stator core 110 has a plurality of teeth (stator teeth) and may be provided so that the coil 120 is wound around a circumference of the teeth when insulators are disposed thereon.

Further, as shown above, the guide member 200 for a motor according to the present invention which guides the coil may be assembled on an upper side of the stator 100 to supply power to the coil.

The rotor 300 is rotatably installed in the center of the stator 100, has a structure which is inserted into an outer circumferential surface or the inside of a rotor core, and has a plurality of magnets mounted thereon. The rotating shaft 30a is installed coaxially with the rotor 300 so that one end is rotatably supported by a lower bearing installed on a bottom surface of the motor housing 10 and the other end is supported by an upper bearing installed on a cover member which is not shown. In the above-described structure, a magnetic field generated in the stator and an electric field generated in the rotor interact with each other and rotate the rotating shaft.

Particularly, in this case, the structure of the guide member 200 for a motor according to the embodiment of the present invention includes the vibration preventing patterns as described above which guide the coil and has a stable fixing force of the coil when the motor is driven, thereby solving a problem of noise caused by a vibration of the coil. Thus, a steering wheel is more stably operated. Also, the structure of the guide member 200 for a motor according to the embodiment of the present invention performs a pressure fixing method using a physical pattern to fix the coil itself to the guide member rather than a method of fixing the coil to the guide groove with an adhesive, thereby reducing manufacturing costs and being environment-friendly.

According to the embodiment of the present invention, in a structure of the guide member which guides a coil wound around the stator to an external power module, a guide member structure of the coil for a motor enabling a more stable steering wheel operation by including a vibration preventing pattern inside a coil guide groove to implement a stable fixing force of the coil when the motor is operated and to reduce noise caused by a vibration of the coil is provided.

The detail description of the present invention as described above has been described regarding a specific embodiment. However, the embodiment may be variously modified by those skilled in the art without departing from the scope of the present invention. Therefore, the scope of the present invention is defined not by the described embodiment but by the appended claims, and encompasses equivalents that fall within the scope of the appended claims.

DESCRIPTION OF SYMBOLS

100: STATOR
110: STATOR CORE
120: COIL
121, 122: TIP END OF COIL
200: GUIDE MEMBER FOR MOTOR
201: GUIDE MEMBER BODY
210: COIL-WINDING GUIDE PART
220: GUIDE GROOVE
230: VIBRATION PREVENTING PATTERN
300: ROTOR

What is claimed is:

1. A guide member for a motor, the guide member comprising:
    a guide member body;
    at least one coil-winding guide part provided on an upper surface of the guide member body; and
    a vibration preventing pattern formed protruding from an inner side of the coil-winding guide part,
    wherein the coil-winding guide part is partitioned by at least one partitioning wall to form a plurality of guide grooves on the upper surface of the guide member body,
    wherein the vibration preventing pattern includes an upper slope part and a lower slope part each forming an acute angle of inclination with respect to a virtual horizontal plane extending from an upper surface of the coil-winding guide part, the lower slope part extending in a direction different from that of the upper slope part, and
    wherein a vertex of a protruding part of the vibration preventing pattern has a rounded surface in contact with a coil.

2. The guide member of claim 1, wherein the vibration preventing pattern includes at least one pair of patterns protruding away from an inner wall of the coil-winding guide part to face each other.

3. A motor comprising:
    a motor housing;
    a stator installed inside the motor housing and including a stator core and a coil wound around the stator core;
    a rotor rotatably installed at a center of the stator;
    a guide member according to claim 2, the guide member being disposed on an upper side of the stator and configured to allow a part of the coil to be wound along the guide grooves of the guide member.

4. A stator of a motor, comprising:
    a stator core including a plurality of stator teeth protruding from an inner surface of the stator toward a center of the stator;
    a plurality of coils wound around the stator teeth; and
    a guide member according to claim 2, the guide member being configured to allow tip ends of the plurality of coils to be routed along the guide grooves of the guide member.

5. The guide member of claim 1, wherein the vibration preventing pattern has a width that is one-third of an overall width (d) of one guide groove of the guide grooves.

6. A motor comprising:
    a motor housing;
    a stator installed inside the motor housing and including a stator core and a coil wound around the stator core;
    a rotor rotatably installed at a center of the stator;
    a guide member according to claim 5, the guide member being disposed on an upper side of the stator and configured to allow a part of the coil to be wound along the guide grooves of the guide member.

7. A stator of a motor, comprising:
a stator core including a plurality of stator teeth protruding from an inner surface of the stator toward a center of the stator;
a plurality of coils wound around the stator teeth; and
a guide member according to claim 5, the guide member being configured to allow tip ends of the plurality of coils to be routed along the guide grooves of the guide member.

8. The guide member of claim 1, wherein the vibration preventing pattern includes an elastic member.

9. A motor comprising:
a motor housing;
a stator installed inside the motor housing and including a stator core and a coil wound around the stator core;
a rotor rotatably installed at a center of the stator;
a guide member according to claim 8, the guide member being disposed on an upper side of the stator and configured to allow a part of the coil to be wound along the guide grooves of the guide member.

10. A stator of a motor, comprising:
a stator core including a plurality of stator teeth protruding from an inner surface of the stator toward a center of the stator;
a plurality of coils wound around the stator teeth; and
a guide member according to claim 8, the guide member being configured to allow tip ends of the plurality of coils to be routed along the guide grooves of the guide member.

11. The guide member of claim 1, wherein at least one communicating part (211) is formed between the guide grooves adjacent to each other.

12. A motor comprising:
a motor housing;
a stator installed inside the motor housing and including a stator core and a coil wound around the stator core;
a rotor rotatably installed at a center of the stator;
a guide member according to claim 11, the guide member being disposed on an upper side of the stator and configured to allow a part of the coil to be wound along the guide grooves of the guide member.

13. A stator of a motor, comprising:
a stator core including a plurality of stator teeth protruding from an inner surface of the stator toward a center of the stator;
a plurality of coils wound around the stator teeth; and
a guide member according to claim 11, the guide member being configured to allow tip ends of the plurality of coils to be routed along the guide grooves of the guide member.

14. A stator of a motor, comprising:
a stator core including a plurality of stator teeth protruding from an inner surface of the stator toward a center of the stator;
a plurality of coils wound around the stator teeth; and
a guide member according to claim 1, the guide member being configured to allow tip ends of the plurality of coils to be routed along the guide grooves of the guide member.

15. A motor comprising:
a motor housing;
a stator installed inside the motor housing and including a stator core and a coil wound around the stator core;
a rotor rotatably installed at a center of the stator;
a guide member according to claim 1, the guide member being disposed on an upper side of the stator and configured to allow a part of the coil to be wound along the guide grooves of the guide member.

* * * * *